J. G. GARNER.
Seed-Planter.

No. 159,087. Patented Jan. 26, 1875.

WITNESSES:
E. Neveux
G. Dieterich

INVENTOR:
J. G. Garner
BY
ATTORNEYS.

UNITED STATES PATENT OFFICE

JOHN G. GARNER, OF PITTSBURG, TEXAS.

IMPROVEMENT IN SEED-PLANTERS.

Specification forming part of Letters Patent No. 159,087, dated January 26, 1875; application filed November 14, 1874.

*To all whom it may concern:*

Be it known that I, JOHN G. GARNER, of Pittsburg, in the county of Camp and State of Texas, have invented a new and Improved Seed-Planter, of which the following is a specification:

My invention has for its object to furnish a simple, convenient, and reliable machine for planting or sowing corn, pease, cotton-seed, and fertilizers, which shall be so constructed and arranged that it may be easily adjusted to sow or plant either of the different substances specified; and it consists in the construction and combination of the various parts of the machine, as hereinafter more fully described, and subsequently pointed out in the claim.

Figure 1:
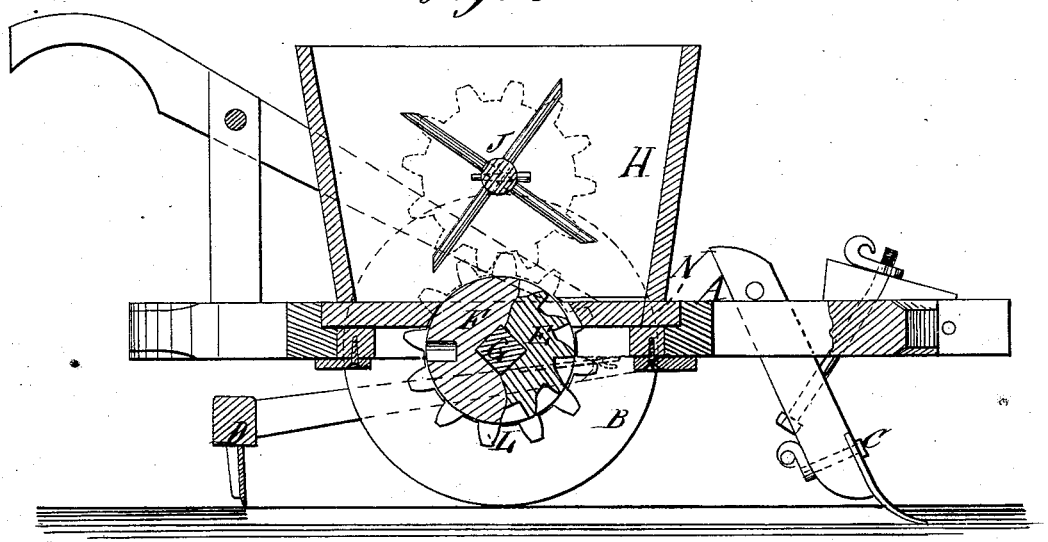
Figure 2:
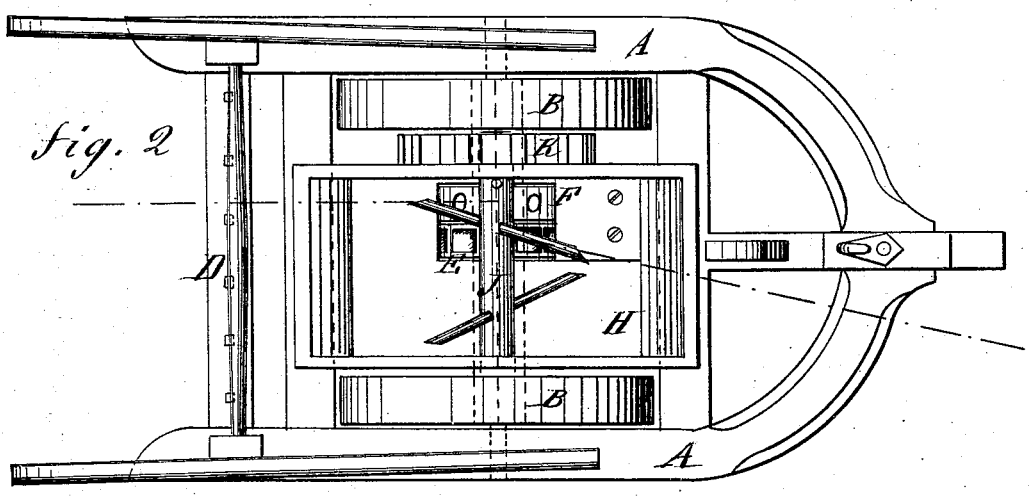
Figure 3:
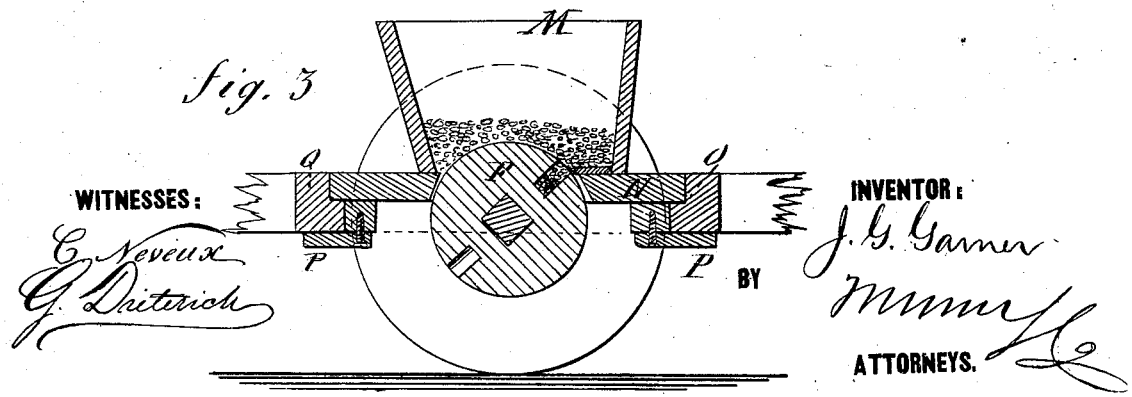

Figure 1 is a sectional elevation of my improved seed-dropper when arranged for dropping cotton-seed. Fig. 2 is a plan view of Fig. 1, and Fig. 3 is a longitudinal elevation of the machine when adjusted for corn or pease.

Similar letters of reference indicate corresponding parts.

A is the truck-frame, mounted on the wheels B, and carrying the furrow-opening plow C and the covering-plow or scraper D. E and F are the pocket-disks running on the shaft G of the truck, for dropping cotton-seed out of a hopper, H, having a large opening in the bottom adapted to the two disks, and containing a rotary agitator, J, for preventing the seed from clogging, the said agitator being geared by a wheel, K, on its shaft with a wheel, L, on the shaft of the truck. M is the hopper to be used for corn and pease. Its bottom opening is made to fit only one disk, and one of the disks is arranged to shift along the shaft out of the way, so that the hopper can be put on with the one that is to be used with it. The hoppers are mounted on boards N, and the boards placed at the ends in rabbets O in the cross-pieces of the frame, and they are fastened in position by buttons P on the cross-pieces.

Having thus described my invention, I claim as new and desire to secure by Letters Patent—

The combination, in a seed-planter, of the dropping-disks E F, mounted loosely on a driving-axle, so as to be shifted thereon, and the interchangeable hoppers H M, adapted for one or both disks, respectively, substantially as herein specified.

JOHN G. GARNER.

Witnesses:
W. T. BAILEY,
W. K. HEATH.